United States Patent [19]

Stephenson

[11] Patent Number: 4,484,429
[45] Date of Patent: Nov. 27, 1984

[54] CONNECTOR FOR A FRAMEWORK STRUCTURE

[76] Inventor: Colin J. S. Stephenson, Flat 5, 56 Claremont Rd., Highgate, London, N.6., England

[21] Appl. No.: 289,855

[22] Filed: Aug. 4, 1981

[30] Foreign Application Priority Data

Aug. 7, 1980 [GB] United Kingdom ............ 8025734
Feb. 20, 1981 [GB] United Kingdom ............ 8105522

[51] Int. Cl.³ .......................... F16B 7/00; E04B 1/58
[52] U.S. Cl. .................................. 52/648; 403/171; 403/192
[58] Field of Search ............ 52/DIG. 10, 648, 650, 52/81, 646; 403/171, 176, 342, 172, 173, 174, 178, 192, 200; 46/29; 35/18, 18 A, 46

[56] References Cited

U.S. PATENT DOCUMENTS

| | | | |
|---|---|---|---|
| 2,970,388 | 2/1961 | Yonkers | 52/DIG. 10 |
| 3,600,825 | 8/1971 | Pearce | 52/DIG. 10 |
| 3,680,897 | 8/1972 | Linthout | 182/228 |
| 3,914,060 | 10/1975 | Miller et al. | 403/171 |

FOREIGN PATENT DOCUMENTS 247160 1/1961 Australia ............ 403/176

*Primary Examiner*—John E. Murtagh
*Attorney, Agent, or Firm*—Remy J. VanOphem

[57] ABSTRACT

A connector having a main body and a first group of at least four projections which extend outwardly from the body in a common plane. A second group of at least four projections extend outwardly from the body at an angle of between 15° and 75° to the aforesaid plane and preferably at a 45° angle to the said plane. The projections of each group are equi-angularly spaced about an axis normal to the plane and the projections of the second group are angularly staggered by half the angle between adjacent projections of the first group about the axis relative to the projections of the first group. Each projection is of non-circular, and preferably triangular, cross-section and the body and projections are made of non-flexible plastics material. Such connectors are used to connect together elongate members having tubular ends to form a framework structure.

14 Claims, 4 Drawing Figures

CONNECTOR FOR A FRAMEWORK STRUCTURE

BACKGROUND OF THE PRESENT INVENTION

This invention relates to connectors of a type suitable for connecting together elongate members to form a framework structure which may be used, for example, as a display structure or a framework structure.

SUMMARY OF THE PRESENT INVENTION

According to one aspect of the invention, there is provided a first group of at least four projections extending outwardly from a main body, and are equi-angularly spaced about an axis normal to a plane parallel to the direction in which each projection of the first group extends from the main body, and a second group of at least four projections extending outwardly from the main body and being equi-angularly spaced about the axis, the projections of the second group each extending at between 15° and 75°, and preferably at 45° or substantially 45°, to the aforesaid plane.

Preferably each projection is of non-circular cross-section.

Preferably, there is an equal number of projections in the first and second groups and the projections of the second group are angularly staggered by half the angle between adjacent projections of the first group about the axis relative to the projections of the first group.

Conveniently, the main body includes a cylindrical or substantially cylindrical surface portion from which the first group of projections extend and a partial spherical or substantially spherical end portion adjoining the cylindrical portion and from which the second group of projections extend.

Advantageously, each projection is of triangular or substantially triangular cross-section. In this case, preferably, a flat or a substantially flat portion is provided at the junction between each pair of adjacent sides of each triangular or substantially triangular projection.

Conveniently, the projections and body of the connector are made of non-flexible plastics material.

According to a second aspect of the invention there is provided a framework structure including a plurality of elongate members having a tubular shape at least at their ends. The plurality of elongate members are interconnected by connectors according to the first aspect of the invention.

Preferably, the elongate members are tubes and are made of deformable plastics material.

BRIEF DESCRIPTION OF THE DRAWINGS

The invention will now be more particularly described with reference to the accompanying drawings, wherein:

Referring to FIGS. 1 through 4 of the drawings, the connector shown therein includes a body part 10 having a cylindrical surface portion 12 and a part-spherical end portion 14 which adjoins the cylindrical surface portion 12. The other end portion of the body part will be referred to later. A first group of four projections 16 extend outwardly from the cylindrical surface portion 12 and are equi-angularly spaced about an axis 18 of the cylindrical surface portion 12. The projections 16 extend in a common plane which is normal to the axis 18. A second group of four projections 20 extend outwardly from the part-spherical end portion 14 of the body part 10. These projections 20 are also equi-angularly spaced about the axis 18 but are angularly staggered by 45° about this axis relative to the projections 16. Also the projections 20 extend at an angle of between 15° and 75°, and preferably at 45°, to the common plane.

Each projection 16 or 20 is of non-circular cross-section and ideally is of substantially triangular cross-section as shown. Each projection 16 or 20 has a flat 22 at the junction between each pair of sides. Each flat 22 may be slightly convex.

Each projection has two sides 24 of equal length and a side 26 of shorter length. Each side 26 has a concave recess.

Figure 1:
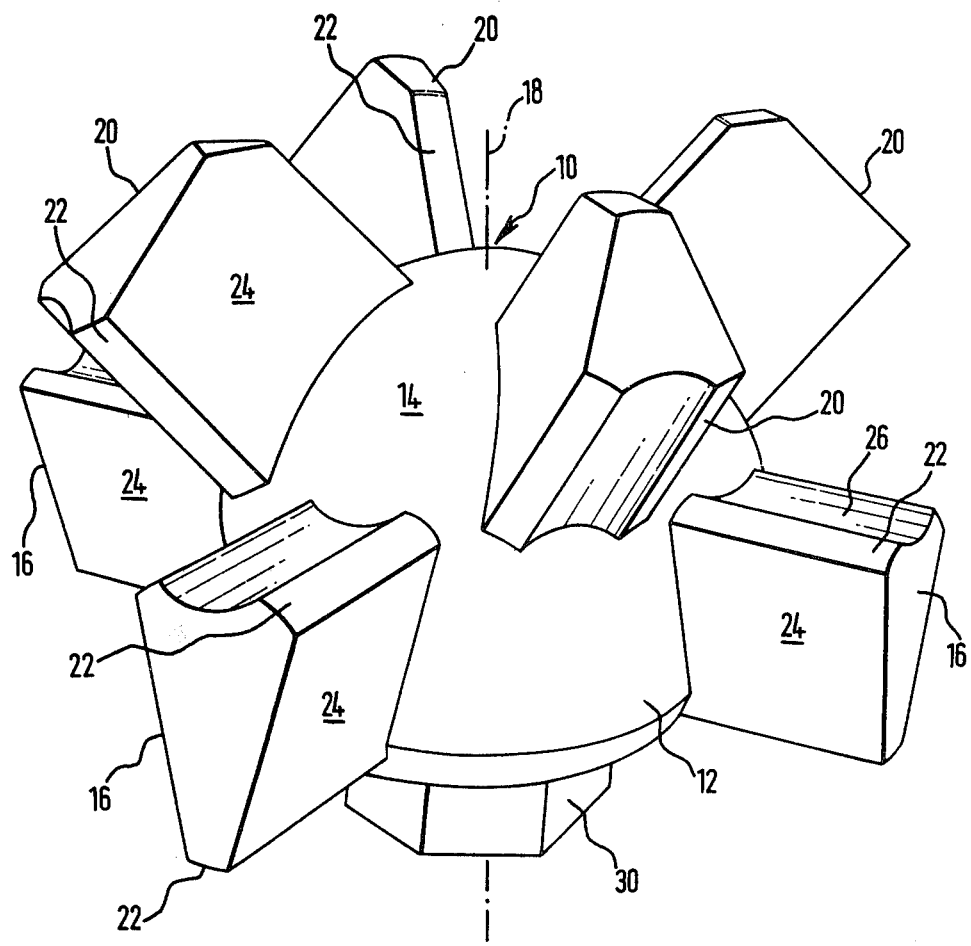
FIG. 1 is a perspective view of one embodiment of a connector according to the invention.
Figure 2:
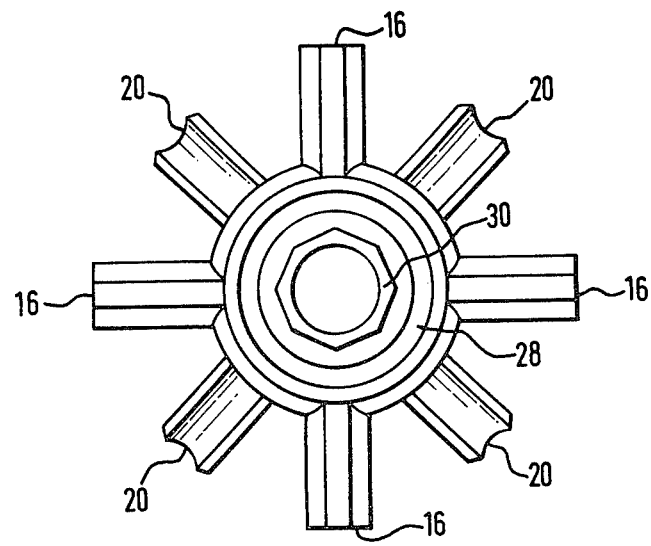
FIG. 2 is an end view of the connector of FIG. 1.

The other end of the connector is provided with an axially inwardly extending annular groove 28 (see FIG. 2) which may receive the end of a tube serving as a vertical support column. As shown this other end of the connector is also provided with an integral, hexagonal nut 30.

The connector is conveniently formed from non-flexible plastics material, such as that sold by I.C.I. under the Trademark 'Noryl'.

Figure 3:
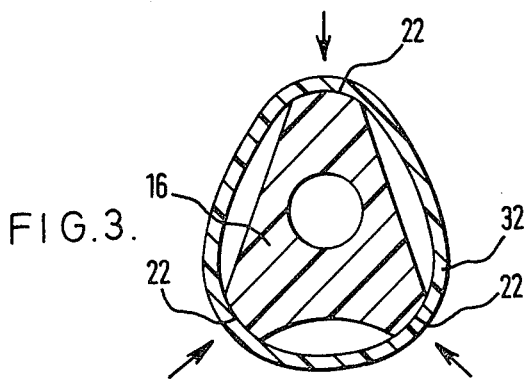
FIG. 3 is a cross-sectional view showing a tube mounted on a projection of the connector of FIGS. 1 and 2.
Figure 4:
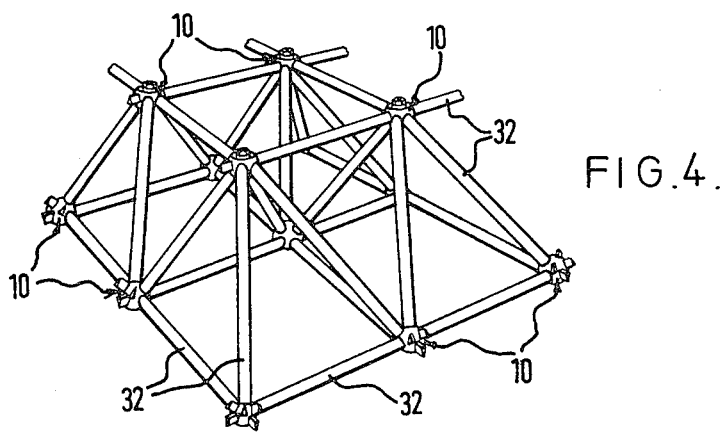
FIG. 4 is a schematic view showing a plurality of elongate members connected together by connectors of FIGS. 1 through 3 to form a space frame.

A plurality of such connectors can be used to connect together elongate members in the form of deformable plastics cylindrical tubes 32 (see FIG. 4) to form a space frame which may be used, for example, as a display stand. In order to locate a tube 32 on a projection 16 or 20, an end of the tube 32 is deformed, by hand pressure, is pushed over the projection and is then released. The inner wall of the tube is engaged by each of the three flats 22 of the projection as an interference fit (see FIG. 3).

In the above embodiment the projections are described as being of non-circular cross-section and while this is highly desirable, it is conceivable that they could be of circular cross-section.

Instead of the tubes 32, solid rods, with cylindrical deformable plastics sockets at each end, could be used.

The connectors and tubes described above could be scaled down for use as a toy or an architect's model.

If desired, the tubes 32 could be heat welded to the projections 16 or 20 in order to provide a permanent installation or, if the tubes 32 and connectors are of the same material, the tubes may be secured to the projections of the connectors by adhesive.

Moreover, the partially spherical end portion may have grooves formed therein, each groove joining a diametrically opposite pair of projections 16 and acting in conjunction with the concave recesses in the sides 26 of the associated projections 16 as a location for a cable which can run through the tubes.

What is claimed as novel is as follows:

I claim:

1. A framework structure comprising:
    (1) a plurality of connectors, wherein each connector of said plurality of connectors comprises:
        (a) a main body having a central axis;
        (b) a first group of at least four projections extending outwardly from each said main body, said first group of at least four projections being equi-angularly spaced about said central axis, each projection of said first group of at least four projections extending from said main body in a plane normal to said central axis;

(c) a second group of at least four projections extending outwardly from each said main body, said second group of at least four projections being equi-angularly spaced about said central axis, each projection of said second group of at least four projections extending at a predetermined angle of between fifteen and seventy-five degrees to said plane, each projection of said first and second groups of at least four projections being of substantially identical noncircular cross-section;

(d) an annular groove formed in each said main body, said annular groove being disposed on the opposite side of said plane from said second group of at least four projections such that said annular groove selectively receives an end of a tubular member for interconnection of said main body with said tubular member; and (2) a plurality of elongate members for connecting together said plurality of connectors to form said framework structure, each elongate member of said plurality of elongate members having substantially cylindrical tubular ends selectively interconnectable with said projections of said first and second groups of at least four projections, said substantially cylindrical tubular ends being formed of a deformable material such as to form an interference fit between said substantially cylindrical tubular ends and said projections of said first and second groups of at least four projections.

2. The framework structure of claim 1, wherein said projections of said second group of at least four projections each extend at forty-five degree angles to said plane.

3. The framework structure of claim 1, wherein said projections of said first and second groups of at least four projections each is of substantially triangular cross-section and has three sides.

4. The framework structure of claim 3, wherein said projections of said first and second groups of at least four projections each further comprises a flat portion provided at the junction between each pair of adjacent sides of said three sides of each said projection.

5. The framework structure of claim 1, wherein there is an equal number of projections in said first and second groups of at least four projections and further wherein said projections of said second group of at least four projections are angularly staggered by half of the angle between adjacent projections of said first group of at least four projections about said central axis relative to said projections of said first group of at least four projections.

6. The framework structure of claim 1, wherein said main body further comprises:
a partially cylindrical surface portion from which said first group of at least four projections extend; and
a partially spherical end portion adjoining said partially cylindrical surface portion, said second group of at least four projections extending from said partially spherical end portion.

7. The framework structure of claim 1, wherein said projections of said first and second groups of at least four projections and said main body of said plurality of connectors are made of non-flexible plastics material.

8. The framework structure of claim 1, wherein said plurality of elongate members are tubes and are made of deformable plastics material.

9. A framework connector comprising:
a main body having a central axis;
a plurality of first projections extending outwardly from said main body, each projection of said plurality of first projections being equi-angularly spaced about said central axis, each projection of said first plurality of projections being disposed in a plane normal to said central axis;
a plurality of second projections extending outwardly from said main body, said plurality of second projections being equal in number to said plurality of first projections, each projection of said plurality of second projections being equi-angularly spaced about said central axis and being angularly interposed two projections of said plurality of first projections about said central axis, each projection of said plurality of second projections being disposed a predetermined angle from said central axis, said predetermined angle being between fifteen and seventy-five degrees; and
an annular groove formed in said main body, said annular groove being disposed on the opposite side of said plane from said plurality of second projections such that said annular groove selectively receives an end of a tubular member for interconnection of said main body with said tubular member.

10. The framework connector of claim 9, wherein said predetermined angle is forty-five degrees.

11. The framework connector of claim 9, wherein said main body further comprises:
an approximately cylindrical surface portion from which said plurality of first projections extend; and
a partial approximately spherical end portion adjoining said approximately cylindrical surface portion, said plurality of second projections extending from said partial approximately spherical end portion.

12. The framework connector of claim 9, wherein said projections of said plurality of first and second projections are comprised of non-flexible plastics material.

13. The framework connector of claim 9, wherein each of said projections of said plurality of first and second projections is of approximately triangular cross-section ahd has two substantially flat main sidewalls of a first predetermined length, a third concave main sidewall of a second predetermined length less than said first predetermined length, and three convex intermediate sidewalls of a third predetermined length, substantially less than said second predetermined length, said three convex intermediate sidewalls being interposed each pair of main sidewalls of said two substantially flat main sidewalls and said third concave main sidewall.

14. The framework connector of claim 9 wherein:
said main body further comprises an approximately cylindrical surface portion from which said plurality of first projections extend, a partial spherical end portion adjoining said approximately cylindrical surface portion, said plurality of second projections extending from said partial spherical end portion, and interconnection means disposed on said main body along said central axis and diametrically opposed to said partial spherical end portion; and each of said projections of said plurality of first and second projections further comprises a non-flexible extension from said main body of approximately triangular parallelepiped shape, each said non-flexible extension having two substantially flat main sidewalls of a first predetermined length, a third concave main sidewall of a second predetermined length less than that of said first predetermined length, and three convex intermediate sidewalls of a third predetermined length substantially less than said second predetermined length, each of said three convex intermediate sidewalls being interposed two adjacent main sidewalls of said two substantially flat main sidewalls and said third concave main sidewall.

* * * * *

UNITED STATES PATENT AND TRADEMARK OFFICE
CERTIFICATE OF CORRECTION

PATENT NO. : 4,484,429
DATED : November 27, 1984
INVENTOR(S) : Colin J. S. Stephenson It is certified that error appears in the above-identified patent and that said Letters Patent is hereby corrected as shown below:

Column 1, between lines 63 and 64 insert the subtitle ----

DETAILED DESCRIPTION OF THE PREFERRED EMBODIMENT ----.

In the Claims

Column 4, line 50, delete "section ahn" and insert ---- section and ----.

In the Abstract

Line 6, delete "the said plane" and insert ---- the plane ----.

Signed and Sealed this

Eighteenth Day of June 1985

[SEAL]

Attest:

DONALD J. QUIGG

Attesting Officer     Acting Commissioner of Patents and Trademarks